(12) United States Patent
Barkan et al.

(10) Patent No.: US 11,809,999 B2
(45) Date of Patent: Nov. 7, 2023

(54) OBJECT RECOGNITION SCANNING SYSTEMS AND METHODS FOR IMPLEMENTING ARTIFICIAL BASED ITEM DETERMINATION

(71) Applicant: ZEBRA TECHNOLOGIES CORPORATION, Lincolnshire, IL (US)

(72) Inventors: Edward Barkan, Miller Place, NY (US); Mark Drzymala, Saint James, NY (US); Darran Michael Handshaw, Sound Beach, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 287 days.

(21) Appl. No.: 16/799,317

(22) Filed: Feb. 24, 2020

(65) Prior Publication Data
US 2021/0264215 A1    Aug. 26, 2021

(51) Int. Cl.
| | |
|---|---|
| *G06K 9/62* | (2022.01) |
| *G06F 16/583* | (2019.01) |
| *G06N 3/08* | (2023.01) |
| *G06N 7/00* | (2023.01) |
| *G06K 9/03* | (2006.01) |
| *G06N 3/088* | (2023.01) |
| *G06F 18/21* | (2023.01) |
| *G06N 7/01* | (2023.01) |
| *G06V 30/12* | (2022.01) |
| *G06V 30/19* | (2022.01) |
| *G06V 30/10* | (2022.01) |

(52) U.S. Cl.
CPC ......... *G06N 3/088* (2013.01); *G06F 16/5854* (2019.01); *G06F 18/217* (2023.01); *G06N 3/08* (2013.01); *G06N 7/01* (2023.01); *G06V 30/12* (2022.01); *G06V 30/19173* (2022.01); *G06V 30/10* (2022.01)

(58) Field of Classification Search
CPC .. G06K 9/6262; G06F 16/5854; G06V 10/98; G06N 3/08; G06N 7/005
See application file for complete search history.

(56) References Cited

U.S. PATENT DOCUMENTS

| | | | | |
|---|---|---|---|---|
| 2012/0293642 A1* | 11/2012 | Berini | ................. | G06V 40/197 348/77 |
| 2013/0304595 A1* | 11/2013 | Goncalves | ............. | G06T 7/001 705/22 |
| 2015/0193780 A1* | 7/2015 | Migdal | ................ | G06Q 30/018 705/317 |

(Continued)

*Primary Examiner* — Bobbak Safaipour
*Assistant Examiner* — Duy Tan (57) ABSTRACT

Object recognition scanning systems and methods for implementing artificial intelligence based item determination are disclosed herein. Example object recognition scanning systems and methods include imaging, by an imager having a field of view (FOV) extending over a scanning area, one or more items within the FOV, and receiving image data of an item imaged by the imager during a scanning session. A trained object recognition model, taking the image data as input, determines a product identification probability for the item. The object recognition scanning systems and methods include executing one of: (a) a first decoding sequence including, (b) a second decoding sequence, or (c) a mismatch detection sequence.

20 Claims, 4 Drawing Sheets

(56) References Cited

U.S. PATENT DOCUMENTS

| | | | |
|---|---|---|---|
| 2015/0363625 A1* | 12/2015 | Wu .................... | G06V 20/10 |
| | | | 382/203 |
| 2018/0121695 A1* | 5/2018 | Ynclino, V ........... | G06Q 20/20 |
| 2018/0189763 A1* | 7/2018 | Olmstead ............. | G06V 10/42 |
| 2019/0220692 A1* | 7/2019 | Wu ....................... | G06F 18/00 |
| 2019/0311210 A1* | 10/2019 | Chatterjee ............ | G06N 3/045 |

* cited by examiner

OBJECT RECOGNITION SCANNING SYSTEMS AND METHODS FOR IMPLEMENTING ARTIFICIAL BASED ITEM DETERMINATION

BACKGROUND

Theft or "shrink" events of products or items are common at retail venue locations, and especially common at high-traffic, or routinely visited locations. Theft can occur in various ways, including at or near a point-of-sale (POS) terminals or items scanners, by a thief preforming one or more of ticket switching (e.g., scanning the barcode a low priced item instead of a high priced item with), scan avoidance, and/or "sweethearting" (e.g., employee related theft involving an employee providing customers with unauthorized discounts or free merchandise or services).

Typical practices of deterring or otherwise preventing shrink events apply a holistic or universal approach, where a retail venue location, or other such establishment, will set up security measurements (e.g., a security guard who checks products against receipts) that typically apply equally to all products. Thus, such typical security measures may be limited, or ineffective, especially at retail venues with large quantities of products or items leaving the store at any given time, where it may be difficult for a holistic approach to accurately monitor all items in the venue location at once. For example, such retail venues may have a difficult time monitoring items, presumably scanned or imaged at a POS terminal, especially in more modern stores where customers typically scan, image, or otherwise implement check out processes themselves via, e.g., a "self-check" POS or kiosk.

Accordingly, in order to reduce shrink events, there is a need for object recognition scanning systems and methods for implementing artificial intelligence based item determination.

SUMMARY

The object recognition scanning systems and methods herein implement artificial intelligence based item determination to detect and prevent item theft, such as ticket switching, scan avoidance, and sweethearting. In some embodiments, the disclosed systems and methods implement object recognition, via trained objection recognition models, to assist in recognition of the item for sale identification in cases where a barcode cannot be scanned successfully. In various embodiments, use of neural network based object recognition in camera/imaging is used to scan and/or image items to reduce theft events.

Accordingly, in an embodiment, the present disclosure describes an object recognition scanning system configured to implement artificial intelligence based item determination. The object recognition scanning system comprises an imager having a field of view (FOV) extending over a scanning area. The imager is configured to image one or more items within the FOV. The object recognition scanning system may further comprise one or more processors configured to receive image data of an item imaged by the imager during a scanning session. In addition, the object recognition scanning system may further comprise a trained object recognition model stored in a memory communicatively coupled to the one or more processors. The object recognition scanning system may further comprise the memory storing instructions that, when executed by the one or more processors, cause the one or more processors to: determine, by the trained object recognition model taking the image data as input, a product identification probability for the item. The instructions, when executed by the one or more processors, may further cause the one or more processors to: execute one of: (a) a first decoding sequence including: (1) identifying at least a portion of a barcode within the image data, and (2) determining a product type of the item based on the at least the portion of the barcode and the product identification probability, wherein the product identification probability for the item meets or exceeds a first product identification threshold value, and wherein the at least the portion of the barcode corresponds to the product type of the item; (b) a second decoding sequence including: determining a product type of the item based on the product identification probability, wherein the product identification probability for the item meets or exceeds a second product identification threshold value, or (c) a mismatch detection sequence including: (1) identifying at least a portion of a barcode within the image data, (2) determining a product type based on the product identification probability, and (3) triggering an mismatch event, wherein the at least a portion of a barcode does not correspond to the product type.

In another embodiment, the present disclosure describes an object recognition scanning method for implementing artificial intelligence based item determination. The object recognition scanning method comprises imaging, by an imager having a field of view (FOV) extending over a scanning area, one or more items within the FOV. The object recognition scanning method further includes receiving, at one or more processors, image data of an item imaged by the imager during a scanning session. The object recognition scanning method further includes determining, by a trained object recognition model taking the image data as input, a product identification probability for the item. The object recognition scanning method further includes executing one of: (a) a first decoding sequence including: (1) identifying at least a portion of a barcode within the image data, and (2) determining a product type of the item based on the at least the portion of the barcode and the product identification probability, wherein the product identification probability for the item meets or exceeds a first product identification threshold value, and wherein the at least the portion of the barcode corresponds to the product type of the item, (b) a second decoding sequence including: determining a product type of the item based on the product identification probability, wherein the product identification probability for the item meets or exceeds a second product identification threshold value, or (c) a mismatch detection sequence including: (1) identifying at least a portion of a barcode within the image data, (2) determining a product type based on the product identification probability, and (3) triggering an mismatch event, wherein the at least a portion of a barcode does not correspond to the product type.

In yet embodiment, the present disclosure describes a tangible machine-readable medium comprising instructions for implementing artificial intelligence based item determination that, when executed, cause a machine to at least: image, by an imager having a field of view (FOV) extending over a scanning area, one or more items within the FOV. The instructions may further cause the machine to receive, at one or more processors of the machine, image data of an item imaged by the imager during a scanning session. The instructions may further cause the machine to determine, by a trained object recognition model taking the image data as input, a product identification probability for the item. Still further, the instructions may further cause the machine to execute one of: (a) a first decoding sequence including: (1) identifying at least a portion of a barcode within the image data, and (2) determining a product type of the item based on the at least the portion of the barcode and the product identification probability, wherein the product identification probability for the item meets or exceeds a first product identification threshold value, and wherein the at least the portion of the barcode corresponds to the product type of the item, (b) a second decoding sequence including: determining a product type of the item based on the product identification probability, wherein the product identification probability for the item meets or exceeds a second product identification threshold value, or (c) a mismatch detection sequence including: (1) identifying at least a portion of a barcode within the image data, (2) determining a product type based on the product identification probability, and (3) triggering an mismatch event, wherein the at least a portion of a barcode does not correspond to the product type.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Figure 1A:
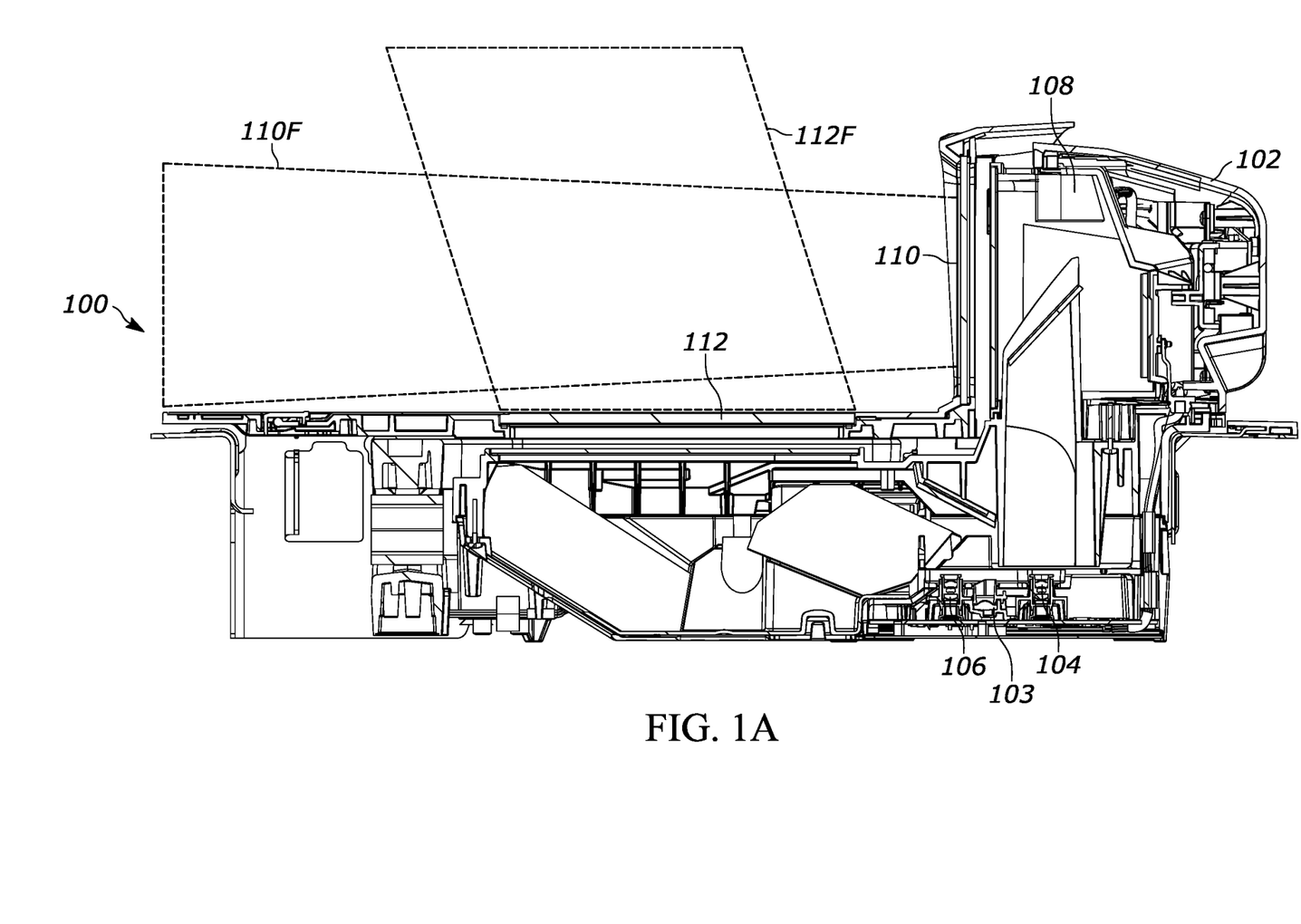
FIG. 1A illustrates a cross section view of an example bioptic imager in accordance with various embodiments disclosed herein.

FIG. 1A illustrates a cross section view of an example bioptic imager 100 in accordance with various embodiments disclosed herein. In particular, bioptic imager 100 includes a housing 102 and a primary imager assembly 103 including one or more primary imagers, represented collectively as elements 104 and 106. These two primary imagers may be a vertical imager 104 and a horizontal imager 106. Primary imager assembly 103 may include two cameras for the purpose of imaging or capturing image data of objects passing through a scanning area of the biopic imager 100. Such image data may comprise 1-dimensional (1D) and/or 2-dimensional (2D) images of objects or items, including, for example, packages, products, or other items that may or may not include barcodes, QR codes, or other such labels for identifying such packages, products, or other items, which may be, in some examples, merchandise available at retail/wholesale store, facility, or the like. A processor (e.g., processor 302) of bioptic imager 100 (e.g., processor 302 and/or trained object recognition model 310) may analyze the image data of objects passing through a scanning area or scan volume of bioptic imager 100.

In some embodiments, processor 302 and/or trained object recognition model 310 may determine, by taking the image data as input, a product identification probability for the item. Additionally, or alternatively, the processor 302 and/or trained object recognition model 310, via primary imager assembly 103, may identify a barcode with the image data and/or decode product information from the barcode.

In certain embodiments, primary imager assembly 103 is a bioptic camera positioned at a surface of a point of sale (POS) station and/or kiosk. Additionally, the vertical imager 104 may be a color camera, monochromatic camera, RFID sensor, or any other suitable imaging device. In certain embodiments, the horizontal imager 106 may be a color camera, monochromatic camera, RFID sensor, or any other suitable imaging device.

In some embodiments, bioptic imager 100 may further includes a primary illumination assembly 108. The primary illumination assembly 108 is positioned within the housing 102, and is configured to emit a primary illumination during a scanning session. In certain embodiments, the primary illumination assembly 108 is operable in an enabled state and a disabled state. In some embodiments, vertical imager 104 is optimized for capturing image data in the enabled state.

In various embodiments, primary imager assembly 103 may activate to capture the image data/image data during a scanning session. In such embodiments, the primary illumination assembly 108 may emit the primary illumination through a substantially vertical imaging window 110 and/or a substantially horizontal imaging window 112 of bioptic imager 100. In some embodiments, primary illumination assembly 108 may begin emitting the primary illumination before the scanning session, and may continue emitting the primary illumination until the end, before the end, or after the end of the scanning session. Similarly, the primary illumination assembly 108 may begin emitting the primary illumination after the beginning of the scanning session, and may stop emitting the primary illumination before the end, until the end, or after the end of the scanning session. Additionally, or alternatively, the primary illumination assembly 108 may emit the primary illumination at intervals (e.g., illumination pulses) before, during, and/or after the scanning session.

The primary illumination has a primary illumination wavelength range. In certain embodiments, the primary illumination is monochromatic illumination, and the primary illumination wavelength range is in the near-infrared spectrum or any other suitable wavelength range to scan 1D or 2D images, including white light.

The substantially vertical imaging window 110 defines a field of view (FOV) $110f$ of bioptic imager 100. In addition the, the substantially horizontal imaging window 112 defines a second FOV $112f$ of bioptic imager 100. Each of the field of views $110f$ and $112f$ are optical fields of views, and either alone or together, may define a scanning area of bioptic imager 100. Together, optical field of views $110f$ and $112f$ allow bioptic imager 100 to scan multiple sides of a given package, item, or otherwise object passing through the scanning area.

As further described herein, bioptic imager 100 may be configured to automatically activate upon an object's or item's entry into the scanning area defined by at least one of field of views 110f and/or 112f. In certain embodiments, once an object enters the scanning area, primary illumination assembly 108 may activate to emit the primary illumination through the substantially vertical imaging window 110. Primary imager assembly 103 may then activate to capture image(s)/image data of the object. It is to be understood however, that activation of bioptic imager 100 need not be automatic upon an object entering the optical FOV. Activation of bioptic imager 100 may occur through any suitable means, including manual activation. Accordingly, activation of bioptic imager 100, e.g., via an object entering the optical FOV, may cause bioptic imager 100 to capture image data. Such image data may include, for example, product codes (e.g., barcodes or QR codes) associated with corresponding products as well as visual images of the product being scanned or imaged, as further described herein.

Figure 1B:
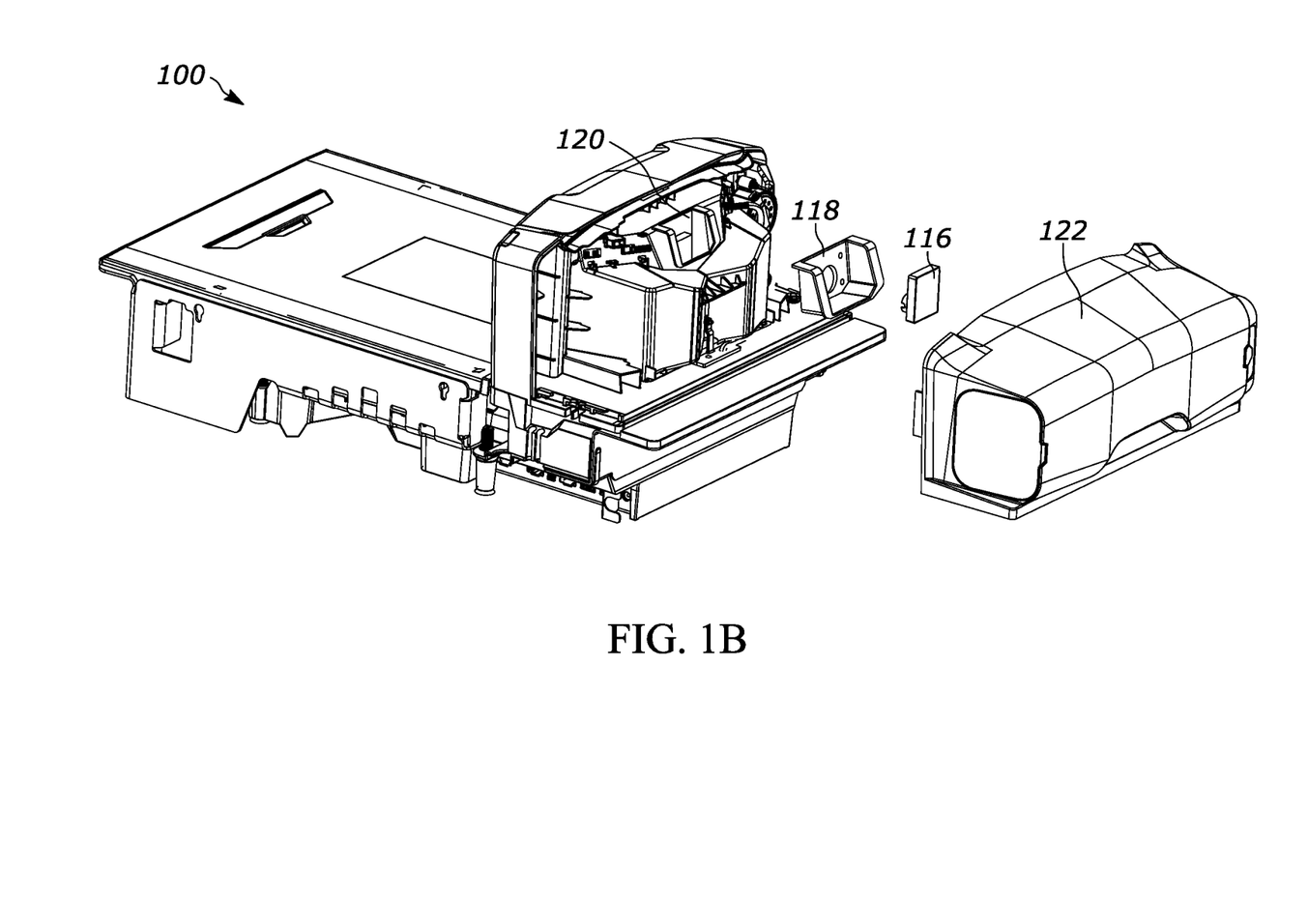
FIG. 1B illustrates an exploded view of the example bioptic imager of FIG. 1A that further includes a secondary imager assembly, in accordance with example embodiments herein.

FIG. 1B illustrates an exploded view of the example bioptic imager of FIG. 1A, in accordance with example embodiments herein. In the embodiment of FIG. 1B, bioptic imager 100 includes a secondary imager assembly 116 including one or more secondary imagers (not shown). The one or more secondary imagers of secondary imager assembly 116 are configured to capture one or more second images/sets of image data of an object or item passing through the scanning area of bioptic imager 100. In certain embodiments, secondary imager assembly 116 is a color camera positioned at an area above the surface of the POS station. In other embodiments, secondary imager assembly 116 may be positioned externally from the housing (e.g., housing 102).

In certain embodiments, the one or more secondary imagers of secondary imager assembly 116 are configured to capture second image data of the item when the primary illumination assembly 108 is in either of the enabled state or the disabled state. For example, the one or more secondary imagers may be configured to capture the one second image data while the primary illumination assembly 108 is in the enabled state (i.e., emitting the primary illumination), or using only ambient light (i.e., without the primary illumination).

To illustrate, if a user wishes to purchase an item, the user may pass the item, including any barcode(s) affixed to or otherwise associated with the item, through FOV 110f and/or FOV 112f of bioptic imager 100. In various embodiments, once the item is passed through FOV 110f and/or FOV 112f, primary imager assembly 103 may activate to capture the image data of the item and/or one or more barcodes associated with the item. As described herein, in some embodiments, the primary illumination assembly 108 may emit the primary illumination (e.g., when operate in the enabled state). Additionally, or alternative, the secondary imager assembly may activate to capture the second image data of the item.

In some embodiments, secondary imager assembly 116 may be configured to capture second image data of an item during, after, or before primary imager assembly 103 has captured image data of the item passing through the scanning area of bioptic imager 100.

In additional embodiments, secondary imager assembly 116 may be configured to capture a landscape and/or portrait image of an item passing through the scanning area of bioptic imager 100. For example, secondary imager assembly 116 in a landscape orientation may be able to achieve capturing the second image data of the item with a wide horizontal field of view (FOV) (e.g., horizontal FOV of ~70 degrees) over bioptic imager 100 imaging surface. Similarly, secondary imager assembly 116 in a portrait orientation may be able to achieve capturing the second image data of the item with a wide vertical FOV (e.g., vertical FOV of ~70 degrees) over bioptic imager 100 imaging surface. Such FOVs are represented by FOV 110f.

In certain embodiments, secondary imager assembly 116 may be configured to activate when an item enters the FOV 110f of bioptic imager 100. It should be understood, that secondary imager assembly 116 may be configured to activate before primary imager assembly 103.

The data, images, or otherwise information captured from either primary imager assembly 103 and/or secondary imager assembly 116 may be transmitted to POS stations, servers, or other processing devices or processors (e.g., remote processor(s) 322) for a variety of purposes including, e.g., product purchases, data storage, inventory purposes, training of artificial intelligence models, etc.

In the embodiment of FIG. 1B, bioptic imager 100 further includes a secondary imager assembly holder 118 and a secondary imager assembly opening 120. The secondary imager assembly holder 118 is designed to couple secondary imager assembly 116 with the secondary imager assembly opening 120. The secondary imager assembly holder 118 and secondary imager assembly opening 120 place secondary imager assembly 116 in a position to capture the second image data of the target object. In certain embodiments, the secondary imager assembly holder 118 may be adjustable between portrait and landscape orientations.

Bioptic imager 100 further includes an adjustable exterior covering 122. The adjustable exterior covering 122 may be a part of the housing 102, and may be detachable from the remainder of bioptic imager 100. For example, in certain embodiments, when portrait orientation images are desired, the adjustable exterior covering 122 may be removed, and the secondary imager assembly holder 118 may be adjusted to facilitate secondary imager assembly 116 capturing the second image data in a portrait orientation.

Figure 2:
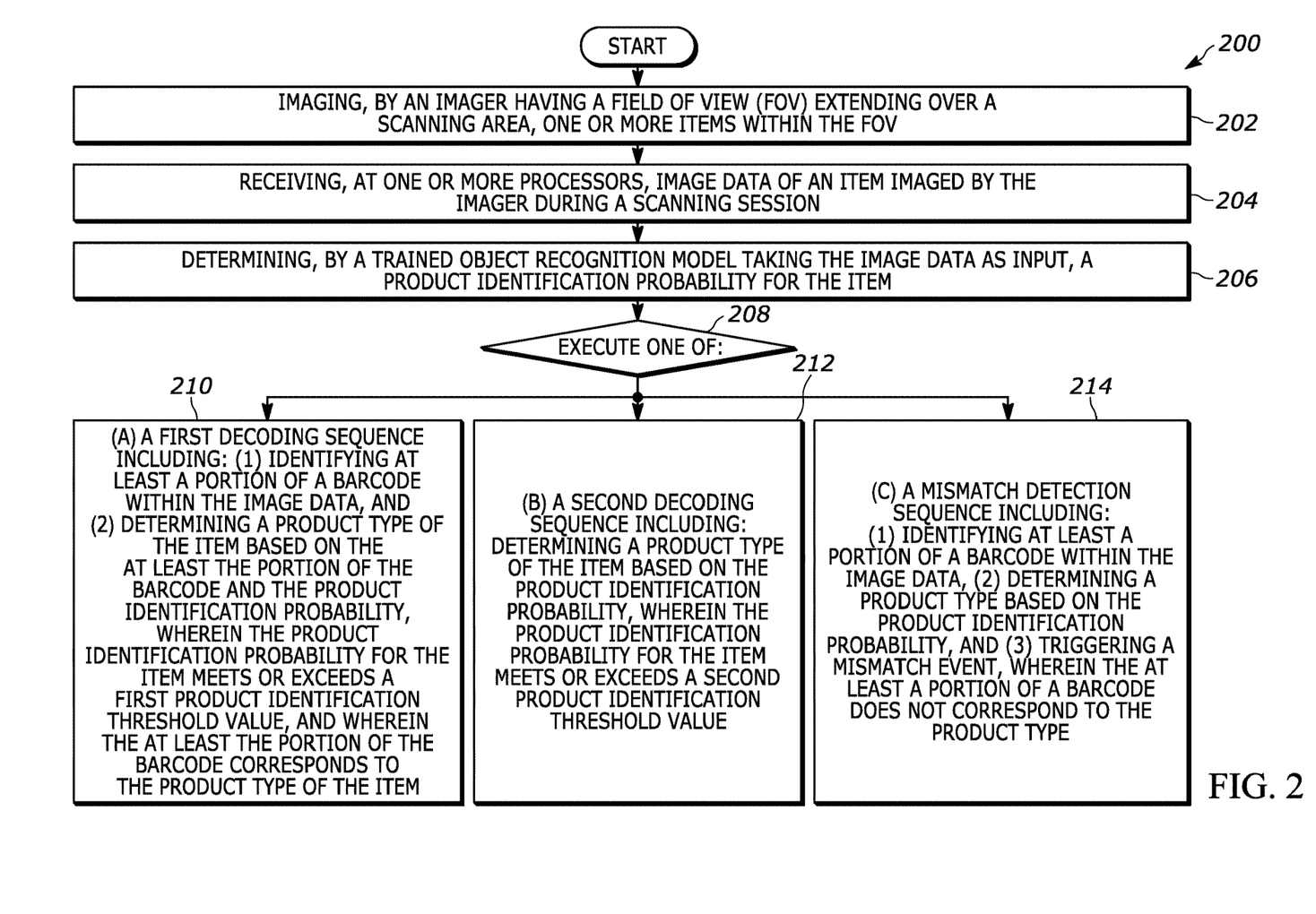
FIG. 2 illustrates an example method for implementing artificial intelligence based item determination, in accordance with example embodiments herein.

FIG. 2 illustrates an example method 200 for implementing artificial intelligence based item determination, in accordance with example embodiments herein. Method 200 may be implemented by an object recognition scanning system, including, for example, bioptic imager 100 as described herein for FIGS. 1A, 1B, or, more generally, by processing platform 300, including remote processor(s) 322 and/or remote server 320, as described for FIG. 3. For example, in some embodiments, the one or more processors may be processors associated with a scanner housing of the imager (e.g., biopic imager 100). In other embodiments, the one or more processors may be processors associated with a bioptic device, kiosk, or other device in local proximity to the scanner. In still further embodiments, the one or more processors can be implemented a server, such as a store, building, or facility collocated with the imager or a remote server (e.g., remote server 320) available via the Internet or cloud.

In particular, in some embodiments object recognition scanning system may include one or more processors (e.g., processor 302) co-located with the imager (e.g., bioptic imager 100 or an imager and/or imager assembly thereof) onsite at a physical location (e.g., a retail or wholesale store). Additionally or alternatively, one or more processors (e.g., remote processors 322) may be located at a server (e.g., 320) remote to the imager. In such embodiments, the server may be communicatively coupled to the imager via a computer network through networking interface 306.

Method 200 beings at block 202, and includes imaging, by an imager (e.g., of primary imager assembly 103 or of secondary imager assembly 116) having a field of view (FOV) extending over a scanning area, one or more items within the FOV (e.g., FOV 110f and/or FOV 112f). In various embodiments, an imager (e.g., of primary imager assembly 103 or of secondary imager assembly 116) comprises a camera or an image sensor or image array and/or and associated lens. In some embodiments, the imager is configured to capture a single image that may comprise various digital pixels. In other embodiments an imager may be configured to capture video or one or more image frames, e.g., video frames comprised of subsequent image frames comprised of various digital pixels. In various embodiments, such pictures, frames, or videos may be recorded or captured in one or more digital file formats, including a portable pix map (PPM) format.

In some embodiments, the object recognition scanning system may further comprise a second imager (e.g., of primary imager assembly 103 or of secondary imager assembly 116) having a second field of view (FOV) (e.g., FOV 110f or FOV 112f) extending over the scanning area. In such embodiments, the second imager is configured to image (e.g., capture image data of) one or more items within the second FOV. The one or more processors (e.g., processor 302) of the object recognition scanning system are configured to receive second image data from the second imager during the scanning session. In embodiments having at least two imagers, e.g., a first imager and a second imager, the imagers may comprise, or be part of, a bioptic imager (e.g., bioptic imager 100). In some embodiments, the first imager and second imager may be part of one camera (e.g., primary imager assembly 103). Still further, in other embodiments, the first imager and second imager may be associated with two different cameras (e.g., primary imager assembly 103 and secondary imager assembly 116).

Generally, embodiments including a first imager and the second imager enhance item verification. This occurs because one imager may be used for item verification via image-based object recognition and another/second camera may be implemented for barcode recognition. Such implementation enhances item recognition/barcode performance, for example, in situations where a barcode is damaged, skewed, or outside of one imager's FOV).

At block 204, object recognition scanning method 200 further includes receiving, at one or more processors (e.g., processor 302), image data of an item imaged by the imager during a scanning session. For example, the image data imaged by the imager may comprise data representing one or more images of the item. Additionally, or alternatively, second image data (e.g., as imaged by a second imager such as secondary imager assembly 116) may comprise data representing at least a portion of a barcode.

At block 206, object recognition scanning method 200 further includes determining, by a trained object recognition model (e.g., object recognition model 310) taking the image data as input, a product identification probability for the item. For example, in various embodiments, the trained object recognition model determines, based on the image data, that the imaged item is possibly one of multiple items, each with an associated probability. In various embodiments, the trained object recognition model (e.g., trained object recognition model 310) may be stored in, and accessible via, non-volatile memory 304 of example processing platform 300.

In some embodiments, the trained object recognition model comprises a convolutional neural network. In such embodiments, the convolutional neural network is pre-trained with image data representative of the item. In still further embodiments, the convolutional neural network may be trained with image data representative of a barcode and/or other alpha-numeric data corresponding to the item and/or its barcode.

In various embodiments, the convolutional neural network or otherwise trained object recognition model (e.g., trained object recognition model 310), may be trained using a supervised or unsupervised machine learning program or algorithm. The machine learning program or algorithm may employ a neural network, which may be a convolutional neural network, a deep learning neural network, or a combined learning module or program that learns in two or more features or feature datasets in a particular areas of interest. The machine learning programs or algorithms may also include natural language processing, semantic analysis, automatic reasoning, regression analysis, support vector machine (SVM) analysis, decision tree analysis, random forest analysis, K-Nearest neighbor analysis, naïve Bayes analysis, clustering, reinforcement learning, and/or other machine learning algorithms and/or techniques. Machine learning may involve identifying and recognizing patterns in existing data (such as image data and identifying barcode data or alpha-numeric data corresponding an item or product) in order to facilitate making predictions for subsequent data (determine a product identification probability for the item or product).

Machine learning model(s), such as the convolutional neural network or otherwise trained object recognition model (e.g., trained object recognition model 310), may be created and trained based upon example (e.g., "training data,") inputs or data (which may be termed "features" and "labels") in order to make valid and reliable predictions for new inputs, such as testing level or production level data or inputs. In supervised machine learning, a machine learning program operating on a server, computing device, or otherwise processor(s), may be provided with example inputs (e.g., "features") and their associated, or observed, outputs (e.g., "labels") in order for the machine learning program or algorithm to determine or discover rules, relationships, or otherwise machine learning "models" that map such inputs (e.g., "features") to the outputs (e.g., labels), for example, by determining and/or assigning weights or other metrics to the model across its various feature categories. Such rules, relationships, or otherwise models may then be provided subsequent inputs in order for the model, executing on the server, computing device, or otherwise processor(s), to predict, based on the discovered rules, relationships, or model, an expected output.

In unsupervised machine learning, the server, computing device, or otherwise processor(s), may be required to find its own structure in unlabeled example inputs, where, for example multiple training iterations are executed by the server, computing device, or otherwise processor(s) to train multiple generations of models until a satisfactory model, e.g., a model that provides sufficient prediction accuracy when given test level or production level data or inputs, is generated. The disclosures herein may use one or both of such supervised or unsupervised machine learning techniques.

Further, in some embodiments, the convolutional neural network or otherwise trained object recognition model (e.g., trained object recognition model 310) may be trained via open source machine learning or CNN code libraries or packages, including, for example, TENSORFLOW, PYTORCH, or the like.

At block 208, object recognition scanning method 200 further includes executing one of several sequences. The sequence executed may be determined based on one or more factors, including, for example, the product identification probability, a detected item mismatch, multiple items detected in the scanning area, a detection of a high theft item, a detection of a high priced item, or other detection or event as described herein.

Generally, for example, as an item is passed through the scanning area or volume of an imager's FOV (s) (e.g., FOV 110f and/or FOV 112f), the imager may recognize portions of item(s) and/or their respective barcodes. In some sequences, method 200 analyses the image data and/or the barcode to determine as to which item is identified. Such determinations may include comparing the image data to the barcode data. In such embodiments, if it results in a match, then a checkout process associated with the item may be allowed to resume. However, if it does not, an event may be triggered, which could include alerting the user to scan/image the item again, notifying security, charging the customer for all items detected, and/or simply recording the event for further analysis.

For example, referring to FIG. 2, at block 210, object recognition scanning method 200 may implement (a) a first decoding sequence including: (1) identifying at least a portion of a barcode within the image data, and (2) determining a product type of the item (e.g., a specific product) based on the at least the portion of the barcode and the product identification probability. In the first decoding sequence, the product identification probability for the item may meet or exceeds a first product identification threshold value (e.g., 80% confidence of item identification). In addition, for the first sequence, the at least the portion of the barcode (e.g., one half of the barcode, where the other half is hidden or damaged) may correspond to the product type of the item.

The first decoding sequence may executed when in situations where only part of the barcode is in an FOV (e.g., FOV 110f or FOV 112f), part of a barcode is damaged, the barcode is poorly printed, or the barcode is tilted with respect to the FOV so that part of it is out of resolution. In such cases, the barcode can often still be partially decoded. However, normally this does not provide enough information to complete a checkout process, which generally requires a cashier to enter the barcode number into the register manually. However, through execution of the first decoding sequence as described herein, the imager can recognize the item and compare against the partial decode information, as determined from the barcode. If a match is found, the imager or scanner can provide feedback (e.g., a beep) as it normally would for a successful decode and transmit the correct item information to the POS for further checkout.

Additionally, or alternatively, first decoding sequence is a priority item decoding sequence, where the product type identified indicates that the item is a priority item. In such embodiments, if the product type indicates that the specific product is a high priced item, or high-theft item, processor (e.g., processor 302) may implement first decoding sequence in order to have product verification from both barcode scanning and item imaging. In such embodiments, for example, biopic imager 100 could be pre-programmed with threshold probability levels that constitute a successful match (e.g., match between a barcode and an item recognition), or how many items from a top of a list of items constitute a match. Such criteria could be adjusted to be more stringent in the case of more expensive items or items that are known to be used in tampering, and less stringent in items that are not a high risk for theft. In this way, pricing or risk criteria can be adjusted for the first decoding sequence such that that an item that is more than a certain price might require that the barcode be scanned, and/or an item that is deemed a high risk of abuse item (e.g., a Kool Aid packet) might require the barcode to be scanned.

Referring to FIG. 2, at block 212, object recognition scanning method 200 may implement (b) a second decoding sequence including: determining a product type of the item based on the product identification probability. In the second decoding sequence, the product identification probability for the item may meet or exceed a second product identification threshold value. In some embodiments, the second sequence may be a non-priority item decoding sequence implemented when the product type indicates that the item is a non-priority item (e.g., a low theft risk item or low price item). Additionally or alternatively, second decoding sequence may be implemented to bypass barcode reading, increasing the efficiency/effective of biopic imager 100. For example, in situations where a product identification probability (e.g., as determined by trained object recognition model 310) of an item is very high (e.g., 99% confidence), biopic imager 100 could beep and send the item information to the POS without needing to scan and/or decode the barcode. Accordingly, the second decoding sequence helps reduce cases involving a missed scan when a user has an item oriented such that the barcode is on the wrong side with respect to a FOV (e.g., FOV 110f and/or FOV 112f).

Additionally, or alternatively, second decoding sequence may be implemented (e.g., even within a single FOV, such as FOV 110f or FOV 112f), and where an area of an item around the barcode could be used for object or item recognition. In such embodiments, at least the portion of the barcode may be identified, e.g., by trained object recognition model 310, within the image data at a consistent location on the item. For example, for items that have the barcode placed in a consistent location (e.g., printed on the package label or machine placed) the recognition model 310 could further rely on the orientation and position of the barcode in order to determine product type of the item. With such predefined information, the trained object recognition model 310 may be trained to detect which side of the package should be seen in the FOV(s) (e.g., FOV 110f and FOV 112f). This information can provide trained object recognition model 310 with information to determine whether tampering has taken place, for example, by a determination of whether a correct side of the package (with a barcode having a known, consistent location) is seen with the FOVs. In particular, in the case of UPC barcodes, the trained object recognition model 310 could be used to determine which side of the item has the barcode/number on it in order to help determine the orientation. In this way, the second decoding sequence may be implemented to detect certain deviant behaviors, such as when a barcode sticker is peeled off of one item to cover the barcode on another, more expensive, item (i.e., ticket switching).

Referring to FIG. 2, at block 214, object recognition scanning method 200 may implement (c) a mismatch detection sequence that includes: (1) identifying at least a portion of a barcode within the image data, (2) determining a product type based on the product identification probability, and (3) triggering an mismatch event, wherein the at least a portion of a barcode does not correspond to the product type. In such embodiments, the detection a mismatch event may cause the one or more processors (e.g., processor 302) to alert a user to initiate a further scanning sequence, notify a security system, charge a user for each of a first product corresponding to the at least the portion of a barcode and a second product corresponding to the product type, and/or recording the mismatch event in a memory (e.g., non-volatile memory 304).

In some embodiments, trained object recognition model 310, as executed by processor 302, may determine a second product type based on second image data (e.g., as captured by secondary imager assembly 116) and at least one of: (1) at least a portion of a second barcode within the second image data, or (2) a second product identification probability of the second item as determined by the trained object recognition model (e.g., trained object recognition model 310). In such embodiments, a mismatch event may be triggered based on the second product type differing from the product type during the scanning session. For example, in some embodiments, a portion of an image around the barcode may be analyzed with trained object recognition model 310 to identify which items are being used to cheat the system. For example, in the case of a Kool Aid ticket switching scenario (e.g., user attempts to scan/position a Kool Aid packet barcode over a high priced item's barcode), second image data as captured from a second FOV could be used by trained object recognition model 310 to recognize a more expensive item (e.g., a second item in the second FOV) and the first FOV could recognize the Kool Aid packet. In these embodiments, processor 302 could flag the item being used to attempt to cheat the scanning/imaging system, and a more stringent criteria could be used at checkout for such items in the future, such as confirming weight, or requiring that no other object is detected.

In a further embodiment, in which one or more processors (e.g., processor 302) execute either of: (a) the first decoding sequence, or (c) the mismatch detection sequence, the one or more processors may determine a location and an orientation of the at least a portion of the barcode. In such the embodiments, the processor(s) may further determine, by the trained object recognition model (e.g., trained object recognition model 310) taking the image data as input, an item area of the item adjacent to the at least the portion of the barcode. Still further, the one or more processors may determine the product type based on the at least the portion of the barcode and the item area. That is, in such embodiments, the location and orientation of the barcode may be determined and the area of the product immediately adjacent to the barcode may analyzed by the CNN (e.g., trained object recognition model 310). Such implementation generally limits the amount of data that needs to be processed and can also assist an imager, or later analytics process performed by processor 302, eliminate image/visual noise from the background and other objects.

In a further embodiment, one or more processors (e.g., processor 302) may execute either of: (a) the first decoding sequence, or (c) the mismatch detection sequence, to: determine a location and an orientation of the at least a portion of the barcode. In such embodiments, the one or more processors (e.g., processor 302) may further execute to identify one or more character symbols on the item in a proximity to the at least the portion of the barcode, where the one or more character symbols are determined by optical character recognition (OCR). In addition, the one or more processors (e.g., processor 302) may execute to determine the product type based on the at least the portion of the barcode and the one or more character symbols. For example, in such embodiments, the processors may determine the location and orientation of the barcode and use OCR (optical character recognition) to identify and locate consistent symbols near the barcode. In such embodiments, identification of an item may be accomplished with simple data analytics (e.g., OCR) without the use of a CNN.

Figure 3:
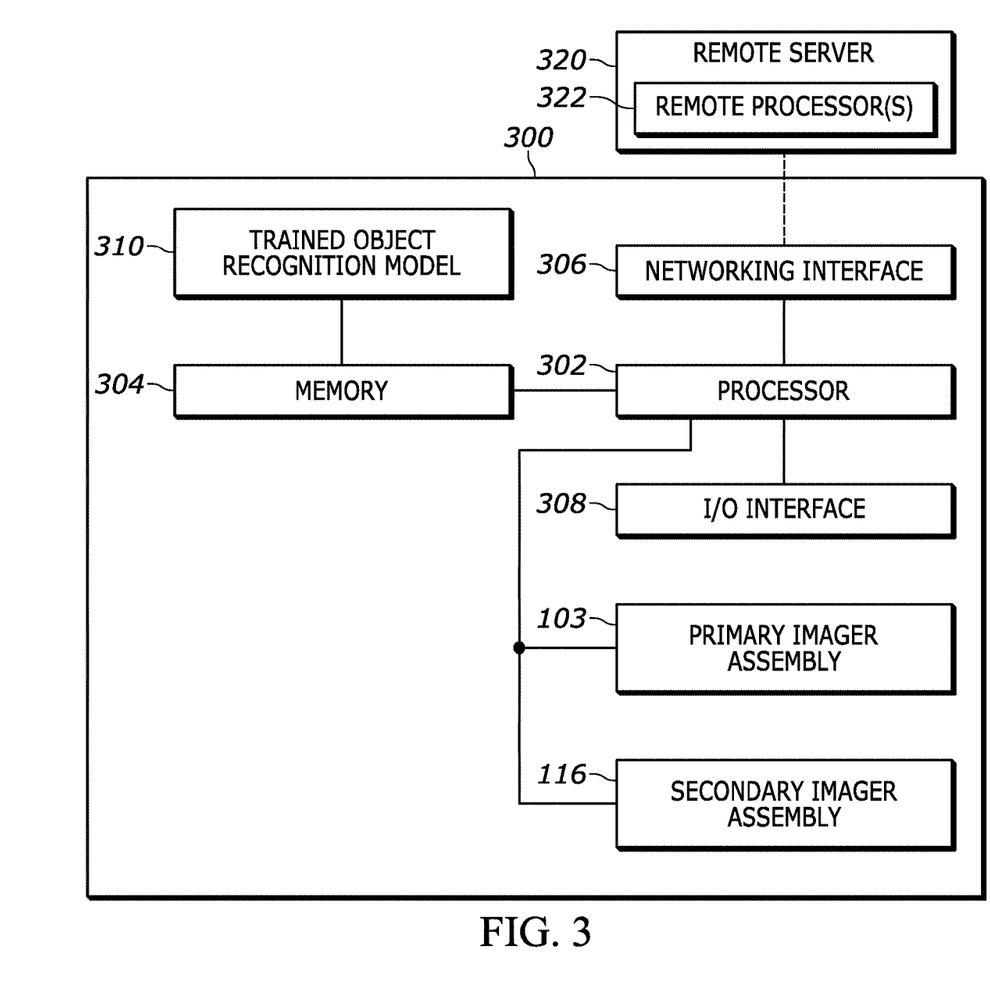
FIG. 3 is a block diagram of an example logic circuit for implementing example methods and/or operations described herein.

FIG. 3 is a block diagram representative of an example logic circuit capable of implementing, for example, one or more components of the example bioptic imager 100, or otherwise system, of FIGS. 1A and/or 1B, or, more generally, the example processor (e.g., processor 302) of FIG. 3. The example logic circuit of FIG. 3 is a processing platform 300 capable of executing instructions to, for example, implement operations of the example methods described herein, as may be represented by the flowcharts of the drawings that accompany this description. Other example logic circuits capable of, for example, implementing operations of the example methods described herein include field programmable gate arrays (FPGAs) and application specific integrated circuits (ASICs).

The example processing platform 300 of FIG. 3 includes a processor 302 such as, for example, one or more microprocessors, controllers, and/or any suitable type of processor. The example processing platform 300 of FIG. 3 includes memory (e.g., volatile memory, non-volatile memory) 304 accessible by the processor 302 (e.g., via a memory controller). The example processor 302 interacts with the memory 304 to obtain, for example, machine-readable instructions stored in the memory 304 corresponding to, for example, the operations represented by the flowcharts of this disclosure. The example processor 302 may also interact with the memory 304 to obtain, or store, a trained object recognition model as described herein. Additionally or alternatively, machine-readable instructions corresponding to the example operations described herein may be stored on one or more removable media (e.g., a compact disc, a digital versatile disc, removable flash memory, etc.) that may be coupled to the processing platform 300 to provide access to the machine-readable instructions stored thereon.

The example processing platform 300 of FIG. 3 also includes a network interface 306 to enable communication with other machines via, for example, one or more networks. The example network interface 306 includes any suitable type of communication interface(s) (e.g., wired and/or wireless interfaces) configured to operate in accordance with any suitable protocol(s). For example, in some embodiments, networking interface 306 may transmit data or information (e.g., imaging data, trained object recognition models, etc., described herein) between remote processor(s) 322 and/or remote server 320, and processing platform 300.

The example, processing platform 300 of FIG. 3 also includes input/output (I/O) interfaces 308 to enable receipt of user input and communication of output data to the user.

The above description refers to a block diagram of the accompanying drawings. Alternative implementations of the example represented by the block diagram includes one or more additional or alternative elements, processes and/or devices. Additionally or alternatively, one or more of the example blocks of the diagram may be combined, divided, re-arranged or omitted. Components represented by the blocks of the diagram are implemented by hardware, software, firmware, and/or any combination of hardware, software and/or firmware. In some examples, at least one of the components represented by the blocks is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more digital signal processors (DSPs), one or more application-specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAs, are specifically configured hardware for performing operations (e.g., one or more of the operations described herein and represented by the flowcharts of this disclosure, if such are present). Some example logic circuits are hardware that executes machine-readable instructions to perform operations (e.g., one or more of the operations described herein and represented by the flowcharts of this disclosure, if such are present). Some example logic circuits include a combination of specifically configured hardware and hardware that executes machine-readable instructions. The above description refers to various operations described herein and flowcharts that may be appended hereto to illustrate the flow of those operations. Any such flowcharts are representative of example methods disclosed herein. In some examples, the methods represented by the flowcharts implement the apparatus represented by the block diagrams. Alternative implementations of example methods disclosed herein may include additional or alternative operations. Further, operations of alternative implementations of the methods disclosed herein may combined, divided, re-arranged or omitted. In some examples, the operations described herein are implemented by machine-readable instructions (e.g., software and/or firmware) stored on a medium (e.g., a tangible machine-readable medium) for execution by one or more logic circuits (e.g., processor(s)). In some examples, the operations described herein are implemented by one or more configurations of one or more specifically designed logic circuits (e.g., ASIC(s)). In some examples the operations described herein are implemented by a combination of specifically designed logic circuit(s) and machine-readable instructions stored on a medium (e.g., a tangible machine-readable medium) for execution by logic circuit(s).

As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) are stored for any suitable duration of time (e.g., permanently, for an extended period of time (e.g., while a program associated with the machine-readable instructions is executing), and/or a short period of time (e.g., while the machine-readable instructions are cached and/or during a buffering process)). Further, as used herein, each of the terms "tangible machine-readable medium," "non-transitory machine-readable medium" and "machine-readable storage device" is expressly defined to exclude propagating signals. That is, as used in any claim of this patent, none of the terms "tangible machine-readable medium," "non-transitory machine-readable medium," and "machine-readable storage device" can be read to be implemented by a propagating signal.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

The invention claimed is:

1. An object recognition scanning system comprising:
an imager having a field of view (FOV) extending over a scanning area, the imager configured to image one or more items within the FOV;
one or more processors configured to receive image data of an imaged item imaged by the imager during a scanning session; and
an object recognition model stored in a memory communicatively coupled to the one or more processors,
the memory storing instructions that, when executed by the one or more processors, cause the one or more processors to:
determine, by the object recognition model taking the image data as input, a product identification probability for the imaged item, the product identification probability being indicative of a level of confidence that the imaged item is one of multiple items stored in the object recognition model;
responsive to the product identification probability meeting or exceeding a first product identification threshold value and being less than a second product identification threshold value, determine a product type based on identifying at least a portion of a barcode within the image data and transmit the product type to a host when the product type matches the one of multiple items stored in the object recognition model; and
responsive to the product identification probability meeting or exceeding the second product identification threshold value, determine the product type based on the one of multiple items stored in the object recognition model and transmitting the product type to the host without regard for the at least a portion of a barcode.

2. The object recognition scanning system of claim 1, further comprising a second imager having a second FOV extending over the scanning area, the second imager configured to image one or more items within the second FOV, wherein the one or more processors are configured to receive second image data from the second imager during the scanning session.

3. The object recognition scanning system of claim 2, wherein the imager and the second imager comprise a bioptic imager.

4. The object recognition scanning system of claim 2, wherein the image data imaged by the imager comprises data representing one or more images of the item, and wherein the second image data comprises data representing the at least a portion of a barcode.

5. The object recognition scanning system of claim 1, wherein the instructions cause the one or more processors to:
responsive to the product identification probability meeting or exceeding the first product identification threshold value and being less than the second product identification threshold value, trigger a mismatch event when the product type does not match the one of multiple items stored in the object recognition model.

6. The object recognition scanning system of claim 1, wherein the object recognition model comprises a convolutional neural network, the convolutional neural network trained with image data representative of the item.

7. The object recognition scanning system of claim 6, wherein the convolutional neural network is further trained with image data representative of a barcode corresponding to the item.

8. The object recognition scanning system of claim 1, wherein the one or more processors are co-located with the imager in a housing of a reader.

9. The object recognition scanning system of claim 1, wherein the one or more processors are located at a server remote to the imager, wherein the server is communicatively coupled to the imager via a computer network.

10. An object recognition scanning system comprising:
an imager having a field of view (FOV) extending over a scanning area, the imager configured to image one or more items within the FOV;
one or more processors configured to receive image data of an imaged item imaged by the imager during a scanning session; and
an object recognition model stored in a memory communicatively coupled to the one or more processors,
the memory storing instructions that, when executed by the one or more processors, cause the one or more processors to:
determine, by the object recognition model taking the image data as input, a product identification probability for the imaged item, the product identification probability being indicative of a level of confidence that the imaged item is one of multiple items stored in the object recognition model;
responsive to the product identification probability meeting or exceeding a product identification threshold value and the one of multiple items stored in the object recognition model being a priority item, determine a product type based on identifying at least a portion of a barcode within the image data and transmit the product type to a host when the product type matches the one of multiple items stored in the object recognition model; and
responsive to the product identification probability meeting or exceeding the product identification threshold value and the one of multiple items stored in the object recognition model being a non-priority item, determining the product type based on the one of multiple items stored in the object recognition model and transmit the product type to the host without regard for the at least a portion of a barcode.

11. The object recognition scanning system of claim 10, further comprising a second imager having a second FOV extending over the scanning area, the second imager configured to image one or more items within the second FOV, wherein the one or more processors are configured to receive second image data from the second imager during the scanning session.

12. The object recognition scanning system of claim 11, wherein the imager and the second imager comprise a bioptic imager.

13. The object recognition scanning system of claim 12, wherein the image data imaged by the imager comprises data representing one or more images of the item, and wherein the second image data comprises data representing the at least a portion of a barcode.

14. The object recognition scanning system of claim 10, wherein the instructions cause the one or more processors to:
responsive to the product identification probability meeting or exceeding the product identification threshold the one of multiple items stored in the object recognition model being the priority item, trigger a mismatch event when the product type does not match the one of multiple items stored in the object recognition model.

15. The object recognition scanning system of claim 10, wherein the object recognition model comprises a convolutional neural network, the convolutional neural network trained with image data representative of the item.

16. The object recognition scanning system of claim 15, wherein the convolutional neural network is further trained with image data representative of a barcode corresponding to the item.

17. The object recognition scanning system of claim 10, wherein the one or more processors are co-located with the imager in a housing of a reader.

18. The object recognition scanning system of claim 10, wherein the one or more processors are located at a server remote to the imager, wherein the server is communicatively coupled to the imager via a computer network.

19. A tangible machine-readable medium comprising instructions for implementing item determination that, when executed, cause a machine to at least:
    image, by an imager having a field of view (FOV) extending over a scanning area, one or more items within the FOV;
    receive, at one or more processors, image data of an item imaged by the imager during a scanning session;
    determine, by an object recognition model taking the image data as input, a product identification probability for the imaged item, the product identification probability being indicative of a level of confidence that the imaged item is one of multiple items stored in the object recognition model;
    responsive to the product identification probability meeting or exceeding a first product identification threshold value and being less than a second product identification threshold value, determine a product type based on identifying at least a portion of a barcode within the image data and transmit the product type to a host when the product type matches the one of multiple items stored in the object recognition model; and
    responsive to the product identification probability meeting or exceeding the second product identification threshold value, determining the product type based on the one of multiple items stored in the object recognition model and transmit the product type to the host without regard for the at least a portion of a barcode.

20. A method for item determination comprising:
    imaging, by an imager having a field of view (FOV) extending over a scanning area, one or more items within the FOV;
    receiving, at one or more processors, image data of an item imaged by the imager during a scanning session;
    determining, by the object recognition model taking the image data as input, a product identification probability for the imaged item, the product identification probability being indicative of a level of confidence that the imaged item is one of multiple items stored in the object recognition model;
    responsive to the product identification probability meeting or exceeding a product identification threshold value and the one of multiple items stored in the object recognition model being a priority item, determining a product type based on identifying at least a portion of a barcode within the image data and transmitting the product type to a host when the product type matches the one of multiple items stored in the object recognition model; and
    responsive to the product identification probability meeting or exceeding the product identification threshold value and the one of multiple items stored in the object recognition model being a non-priority item, determining the product type based on the one of multiple items stored in the object recognition model and transmitting the product type to the host without regard for the at least a portion of a barcode.

\* \* \* \* \*